(12) United States Patent
Leng et al.

(10) Patent No.: US 12,054,155 B2
(45) Date of Patent: Aug. 6, 2024

(54) METHOD OF ADAPTIVE ESTIMATION OF ADHESION COEFFICIENT OF VEHICLE ROAD SURFACE CONSIDERING COMPLEX EXCITATION CONDITIONS

(71) Applicant: TONGJI UNIVERSITY, Shanghai (CN)

(72) Inventors: Bo Leng, Shanghai (CN); Da Jin, Shanghai (CN); Xing Yang, Shanghai (CN); Lu Xiong, Shanghai (CN); Zhuoping Yu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 122 days.

(21) Appl. No.: 17/639,593

(22) PCT Filed: Sep. 25, 2020

(86) PCT No.: PCT/CN2020/117804
§ 371 (c)(1),
(2) Date: Mar. 2, 2022

(87) PCT Pub. No.: WO2021/103797
PCT Pub. Date: Jun. 3, 2021

(65) Prior Publication Data
US 2022/0332323 A1    Oct. 20, 2022

(30) Foreign Application Priority Data
Nov. 25, 2019 (CN) .......................... 201911167653.8

(51) Int. Cl.
*B60W 40/068*   (2012.01)
*G06F 18/25*    (2023.01)

(52) U.S. Cl.
CPC .......... *B60W 40/068* (2013.01); *G06F 18/25* (2023.01); *B60W 2520/26* (2013.01);
(Continued)

(58) Field of Classification Search
None
See application file for complete search history.

(56) References Cited

U.S. PATENT DOCUMENTS

| | | | | |
|---|---|---|---|---|
| 5,747,682 A | * | 5/1998 | Hirano | B60T 8/17551 |
| | | | | 73/115.07 |
| 10,988,142 B1 | * | 4/2021 | Mehrotra | B60W 40/068 |
| 2018/0105181 A1 | * | 4/2018 | Skold | B60W 40/068 |

FOREIGN PATENT DOCUMENTS

CN        108594652 B   *  5/2021  ............ B60W 50/00

OTHER PUBLICATIONS

Albinsson, Anton & Bruzelius, Fredrik & Jacobson, Bengt & Fredriksson, Jonas. (2016). Design of tyre force excitation for tyre-road friction estimation. Vehicle System Dynamics. 55. 10.1080/00423114.2016.1251598. (Year: 2016).*

* cited by examiner

*Primary Examiner* — Peter D Nolan
*Assistant Examiner* — Jacob Kent Besteman-Street
(74) *Attorney, Agent, or Firm* — JCIP GLOBAL INC.

(57) ABSTRACT

A method for adaptive estimation of a road surface adhesion coefficient for a vehicle with complex excitation conditions taken into consideration comprises the following steps: 1) designing an estimator according to a single-wheel dynamics model of a vehicle, and estimating a longitudinal tire force and a road surface peak adhesion coefficient under longitudinal excitation; 2) designing an estimator according to a two-degree-of-freedom kinematic model of the vehicle, and estimating a tire aligning moment and a road surface peak adhesion coefficient under excitation of a lateral force; and 3) determining an excitation condition met by the vehicle according to a vehicle state parameter, performing fuzzy inference to obtain limits achievable by current longitudinal and lateral tire forces, and designing a fusion (Continued)

observer to fuse estimation results. The method achieves favorable robustness, improves real-time capability, and can be performed quickly and accurately.

7 Claims, 4 Drawing Sheets

(52) U.S. Cl.
CPC ..... *B60W 2520/28* (2013.01); *B60W 2520/30* (2013.01); *B60W 2552/40* (2020.02)

METHOD OF ADAPTIVE ESTIMATION OF ADHESION COEFFICIENT OF VEHICLE ROAD SURFACE CONSIDERING COMPLEX EXCITATION CONDITIONS

CROSS-REFERENCE TO RELATED APPLICATION

This application is a 371 of international application of PCT application serial no. PCT/CN2020/117804, filed on Sep. 25, 2020, which claims the priority benefit of China application no. 201911167653.8, filed on Nov. 25, 2019. The entirety of each of the above mentioned patent applications is hereby incorporated by reference herein and made a part of this specification.

FIELD OF TECHNOLOGY

The invention relates to a field of automobile control, in particular to a method of adaptive estimation of an adhesion coefficient of a vehicle road surface considering complex excitation conditions.

BACKGROUND

A peak adhesion coefficient of a vehicle road surface is a key parameter to implement precise and high-quality motion control of an automobile. The current method is to construct a state observer under a condition of tire force excitation in a single direction. Such a method is unable to perform accurate estimation when the excitation is unmet. And also, when longitudinal-lateral coupling occurs in tire forces, a tire model is distorted. In addition, an estimator has slow estimation convergence and low robustness. Therefore, how to comprehensively utilize a road surface identification method under longitudinal and lateral tire excitation forces will be a difficulty and focus of future research.

SUMMARY

The purpose of the present invention is to provide a method of adaptive estimation of an adhesion coefficient of a vehicle road surface considering complex excitation conditions in order to overcome the above-mentioned defects of the prior art.

The object of the present invention can be achieved through the following technical solutions:

a method of adaptive estimation of an adhesion coefficient of a vehicle road surface considering complex excitation conditions, the method including the following steps:
1) designing an estimator based on a single-wheel dynamical model of a whole vehicle, and estimating a peak adhesion coefficient of the road surface under a longitudinal tire force and longitudinal excitation;
2) designing an estimator based on a two-degree-of-freedom kinematic model of the whole vehicle, and estimating the peak adhesion coefficient of the road surface under a tire aligning torque and lateral force excitation;
3) determining the excitation conditions met by the vehicle from vehicle state parameters, obtaining limits that the current longitudinal and lateral tire forces can reach by fuzzy inference, and thereby designing a fusion observer to fuse estimation results.

In step 1), the single-wheel dynamical model of the whole vehicle is as follows:

$$\dot{\omega} = \frac{1}{I_w}[T_m - \mu_x(\theta_x, \lambda) \cdot F_z \cdot R]$$

$$\lambda = \begin{cases} \dfrac{\omega \cdot R - v_x}{\omega \cdot R}; v_x < \omega \cdot R \\ \dfrac{v_x - \omega \cdot R}{v_x}; v_x \geq \omega \cdot R \end{cases}$$

wherein $\omega$ is an angular velocity of the wheel, $\dot{\omega}$ is an angular acceleration of the wheel, R is a radius of the wheel, $T_m$ is a driving/braking torque acting on the wheel, $F_z$ is a vertical load acting on the wheel, $I_w$ is a rotational inertia of the wheel, $\lambda$ is a slip rate of the wheel, $v_x$ is a longitudinal speed at a center of the wheel, and $\mu_x(\theta_x,\lambda)$ is a current utilization adhesion coefficient of the tire to the road surface obtained based on a tire model.

An expression of the tire model is as follows:

$$\mu(\theta, \lambda) = \theta - \theta e^{-\frac{c_1}{\theta}(\lambda + c_2 \lambda^2)} - c_3 \lambda \text{sgn}(\lambda) + c_4 \lambda^2$$

wherein $\theta$ is the peak adhesion coefficient of the road surface, i.e., the peak adhesion coefficient of the road surface corresponding to a highest point of a $\mu$–$\lambda$ curve, is a longitudinal slip stiffness of the tire, i.e., a slope of the $\mu$–$\lambda$ curve at an origin, and $c_2$, $c_3$ and $c_4$ are respectively control parameters for a descending section of the curve of the peak adhesion coefficient of the road surface versus the slip rate.

In step 1), an expression for estimating the peak adhesion coefficient of the road surface under the longitudinal tire force and longitudinal excitation is as follows:

$$\hat{F}_x = \frac{I_w}{R}(y + K\omega) - F_z \cdot \mu_x(\hat{\theta}_x, \lambda)$$

$$\dot{y} = -\frac{K}{I_w}(T_m + R\hat{F}_x) + \frac{R}{I_w} \cdot \frac{\partial \mu_x(\hat{\theta}_x, \lambda)}{\partial \theta_x} \cdot \dot{\hat{\theta}}_x$$

$$\dot{\hat{\theta}}_x = \gamma[\theta_x(\lambda, \hat{F}_x) - \hat{\theta}_x]$$

wherein $\hat{F}_x$ is an estimated value of the tire longitudinal force, $\mu_x(\hat{\theta}_x,\lambda)$ is the utilization adhesion coefficient calculated based on an estimated value of the adhesion coefficient of the road surface and the slip rate, K is a gain of a longitudinal force estimator, $\theta_x(\lambda,\hat{F}_x)$ is the peak adhesion coefficient of the road surface calculated from the curve described by the tire model based on a current longitudinal force and slip rate, $\hat{\theta}_x$ is an estimated value of the peak adhesion coefficient of the road surface under longitudinal excitation, $\gamma$ is a gain of an adhesion coefficient estimator of the road surface, y is an intermediate variable, $\dot{y}$ is a derivative of y with respect to time, and $\dot{\hat{\theta}}_x$ is a derivative of $\hat{\theta}_x$ with respect to time.

In step 2), the two-degree-of-freedom kinematic model of the whole vehicle is as follows:

$$\alpha_f = \beta + \frac{l_f R}{v_0} - \delta$$

$$\alpha_r = \beta - \frac{l_r R}{v_0}$$

wherein δ is a rotation angle of a front wheel, lf and lr are respectively a distance from a center of the front wheel and of a rear wheel to a center of mass, $v_0$ is a longitudinal speed of the vehicle, β is a side slip angle of the vehicle, αf and αr are respectively a slip angle of the front wheel and of the rear wheel, and R is the radius of the wheel.

In step 2), an expression for estimating the peak adhesion coefficient of the road surface under the tire aligning torque and lateral force excitation is as follows:

$$\hat{M}_k = A\dot{\delta}_w + B\delta_w + i_s(\delta_w)M_s + i_m(\delta_w)M_m$$

$$\hat{M}_k = f(\alpha, F_z)$$

$$\dot{\hat{\theta}}_y = k_1 \operatorname{sgn}(\hat{M}_k) \cdot (M_k - \hat{M}_k) + k_2 \operatorname{sgn}(\hat{\alpha}_y) \cdot (\alpha_y - \hat{\alpha}_y)$$

wherein α is a slip angle of the wheel, $\delta_w$ is a rotation angle of a steering wheel, $i_s(\delta_w)$ is a torque-to-rotation ratio of a booster motor to a master pin, $i_m(\delta_w)$ is a torque-to-rotation ratio of the steering wheel to the master pin, $M_m$ is a torque applied to the steering wheel, $M_s$ is a torque of the booster motor, A and B are fitting parameters, $M_k$ is a fitting total aligning torque, $\hat{M}_k$ is an estimated value of the aligning torque calculated based on the vertical load of the wheel and the slip angle, $F_z$ is the vertical load applied on the wheel, $\hat{\alpha}_y$ is an estimated value of a lateral acceleration of the vehicle, $a_y$ is an actual value of the lateral acceleration of the vehicle, $k_1$ and $k_2$ are gains of the estimators, $\hat{\theta}_3$, is an estimated value of the peak adhesion coefficient of the road surface under lateral force excitation, and $\dot{\hat{\theta}}_y$ is a derivative of $\hat{\theta}_y$ with respect to time.

Step 3) includes:
31) obtaining a vehicle excitation state by fuzzy inference;
32) performing adaptive estimation of the peak adhesion coefficient of the road surface under complex excitation.

Step 31) is as follows:
inputting a membership function, taking a slip rate reference $\lambda/C_\lambda$ and a slip angle reference $\alpha/C_\alpha$ as input quantities, wherein $C_\lambda$ and $C_\alpha$ are catastrophe points at which tire characteristics enter a nonlinear zone and are respectively taken as the corresponding slip rate and slip angle at which the peak adhesion coefficient is reached, and taking $\hat{C}_1$, $\hat{C}_2$ of different estimators as output quantities; setting [0,1] as a domain of both the input quantities and the output quantities; and dividing the domain into corresponding intervals respectively having small, medium and large fuzzy membership degrees.

In step 32), an expression for performing adaptive estimation of the peak adhesion coefficient of the road surface under complex excitation is as follows:

$$\dot{\hat{\theta}} = \dot{\hat{\theta}}_x + \dot{\hat{\theta}}_y$$

$$\dot{\hat{\theta}}_x = \gamma[\theta_x(\lambda, \hat{F}_x) - C_1 \cdot \hat{\theta}]$$

$$\dot{\hat{\theta}}_y = k_1 \operatorname{sgn}(\hat{M}_k) \cdot (M_k - \hat{C}_2 \hat{M}_k) + k_2 \operatorname{sgn}(\hat{\alpha}_y) \cdot (\alpha_y - \hat{C}_2 \hat{\alpha}_y)$$

wherein $\hat{C}_1$ a representative value of longitudinal sliding degree of the wheel, $\hat{C}_2$ is a representative value of side slip degree of the wheel, and $\hat{\theta}$ is an estimated value of the peak adhesion coefficient of the road surface.

Compared with the prior art, the present invention has the following advantages:
1. the estimation algorithm of an adhesion coefficient of a vehicle road surface designed by the present invention, under complex excitation forces, can determine longitudinal sliding and side slipping states of a tire in real time, so as to make adaptive adjustments to a tire model, thereby ensuring that the estimation stably converges without divergence;
2. the estimation algorithm of an adhesion coefficient of a vehicle road surface designed by the present invention, based on concurrent observation of longitudinal sliding and side slipping states of the tire, can make confidence determination and fuse estimation results, and thus has superior real-time performance over currently existing estimation algorithms that can only use one of the excitation forces; and
3. the estimation algorithm of an adhesion coefficient of a vehicle road surface designed by the present invention, as early as in an initial stage of steering, can make fast and accurate estimation of the road surface according to an aligning torque.

DETAILED DESCRIPTION OF THE EMBODIMENTS

The present invention is described in detail below with reference to the accompanying drawings and specific embodiments.

Embodiments

The present invention is described in detail below with reference to the accompanying drawings and specific embodiments. Apparently, the described embodiments are some, but not all, embodiments of the present invention. Based on the embodiments of the present invention, all of other embodiments obtained by a person of ordinary skill in the art without any creative effort shall belong to the protection scope of the present invention.

Embodiments

Figure 1:
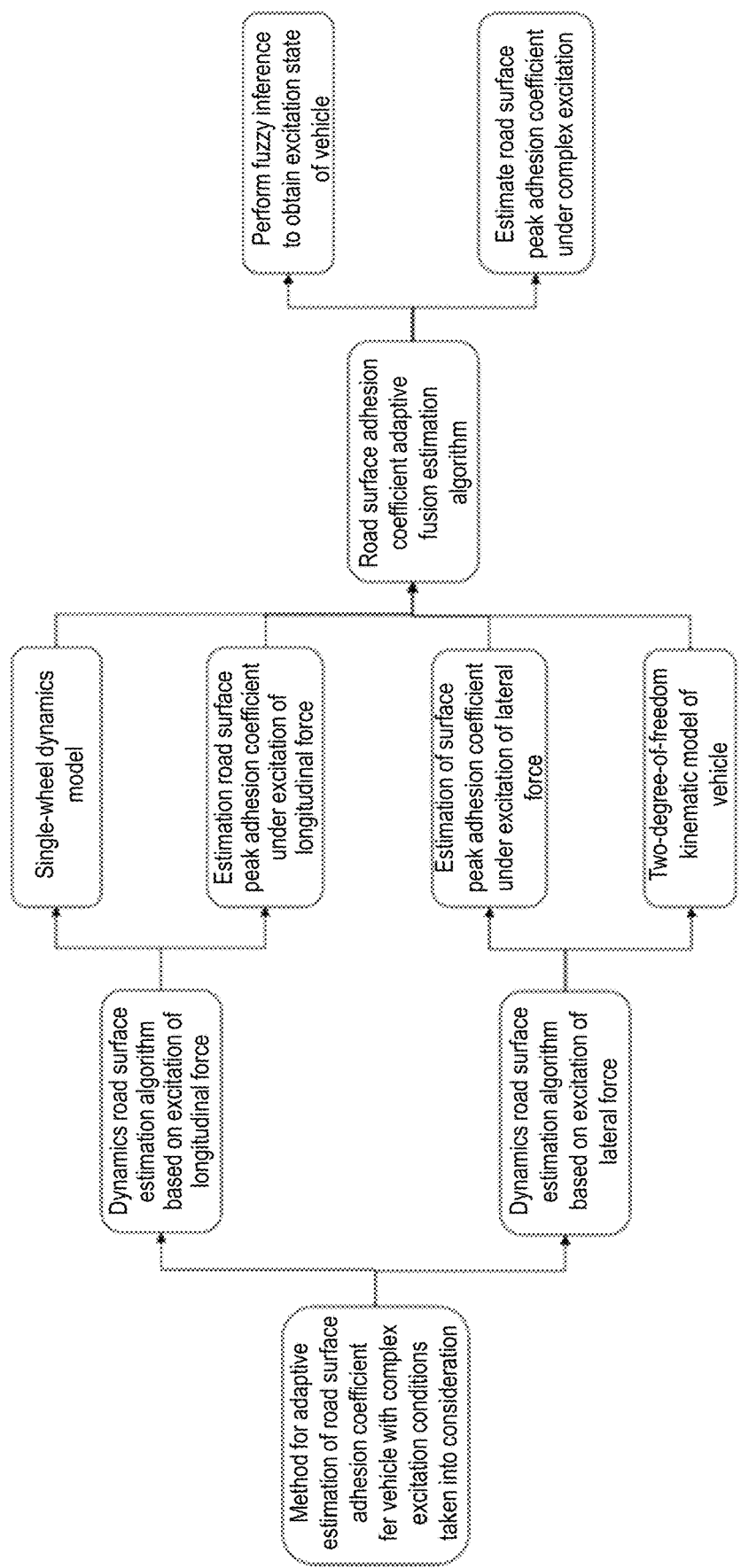
FIG. 1 is a flow chart of a method according to the present invention.
Figure 2:
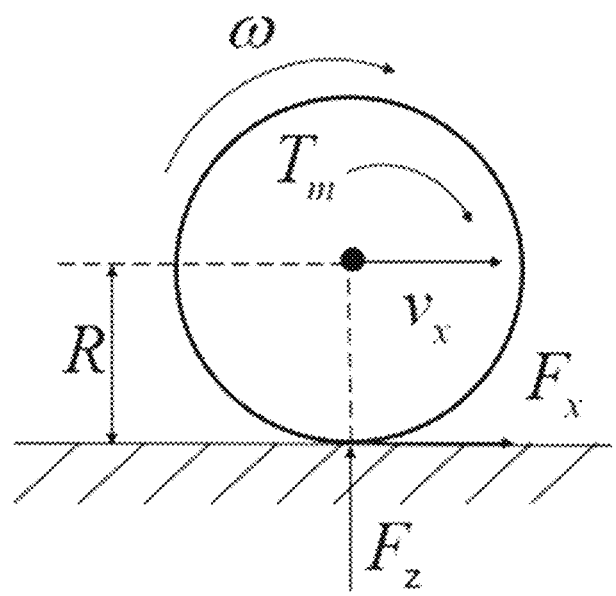
FIG. 2 is a schematic diagram of a single wheel dynamical model according to an embodiment.
Figure 3:
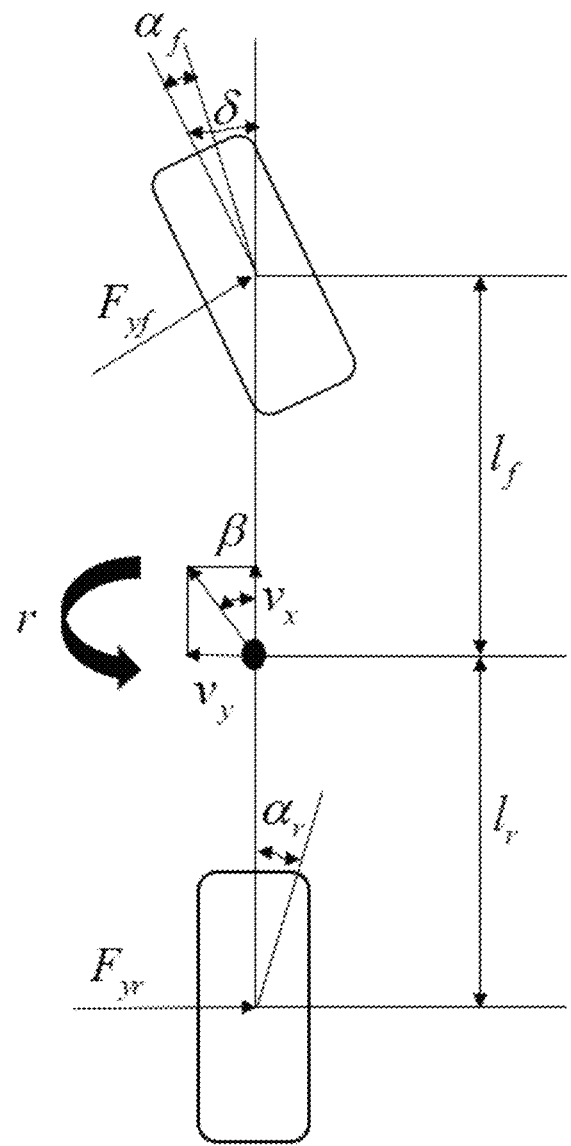
FIG. 3 is a schematic diagram of a two-degree-of-freedom kinematic model of a whole vehicle according to an embodiment.
Figure 4:
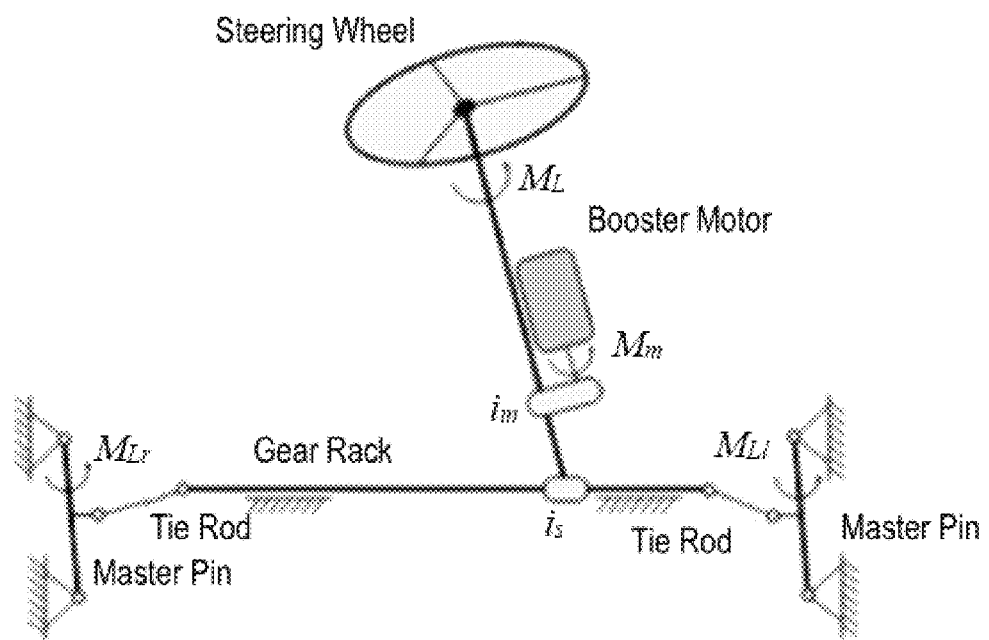
FIG. 4 is a schematic diagram of estimation of an aligning torque according to an embodiment.

As shown in FIG. 1, the present invention provides a method of adaptive estimation of an adhesion coefficient of a vehicle road surface considering complex excitation conditions, the method including the following steps:
Step 1, designing an estimator based on a single-wheel dynamical model, and estimating a peak adhesion coefficient of the road surface under a longitudinal tire force and longitudinal excitation. The process includes:

1.1 establishing a single-wheel dynamical model of a whole vehicle.

First, obtaining a wheel angular velocity and a wheel slip rate:

$$\dot{\omega} = \frac{1}{I_\omega}[T_m - \mu_x(\theta_x, \lambda) \cdot F_z \cdot R]$$

$$\lambda = \begin{cases} \dfrac{\omega \cdot R - v_x}{\omega \cdot R}; & v_x < \omega \cdot R \\ \dfrac{v_x - \omega \cdot R}{v_x}; & v_x \geq \omega \cdot R \end{cases}$$

wherein $\omega$ is the angular velocity of the wheel, R is a radius of the wheel, $T_m$ is a driving/braking torque acting on the wheel, $F_z$ is a vertical load acting on the wheel, $I_\omega$ is a rotational inertia of the wheel, $\lambda$ is a slip rate of the wheel, $v_x$ is a longitudinal speed at a center of the wheel, and $\mu_x(\theta_x,\lambda)$ is a current utilization adhesion coefficient of the tire to the road surface obtained based on a tire model;

Then, expressing the tire model as:

$$\mu(\theta, \lambda) = \theta - \theta e^{-\frac{c_1}{\theta}(\lambda + c_2\lambda^2)} - c_3\lambda\,\mathrm{sgn}(\lambda) + c_4\lambda^2$$

wherein $\theta$ is the peak adhesion coefficient of the road surface, i.e., the peak adhesion coefficient of the road surface corresponding to a highest point of a $\mu$–$\lambda$ curve, $\lambda$ is the slip rate of the wheel, $c_1$ is a longitudinal slip stiffness of the tire, i.e., a slope of the $\mu$–$\lambda$ curve at an origin, and $c_2$, $c_3$, and $c_4$ are respectively control parameters for a descending section of the curve of the peak adhesion coefficient of the road surface versus the slip rate.

1.2 An expression of an estimation algorithm of the peak adhesion coefficient of the road surface under the longitudinal tire force and longitudinal excitation is as follows:

$$\hat{F}_x = \frac{I_w}{r}(y + K\omega) - F_z \cdot \mu_x(\hat{\theta}_x, \lambda)$$

$$\dot{y} = -\frac{K}{I_w}(T_m + R\hat{F}_x) + \frac{R}{I_w} \cdot \frac{\partial \mu_x(\hat{\theta}_x, \lambda)}{\partial \theta_x} \cdot \dot{\hat{\theta}}_x$$

$$\dot{\hat{\theta}}_x = \gamma[\theta_x(\lambda, \hat{F}_x) - \hat{\theta}_x]$$

wherein $\hat{F}_x$ is an estimated value of the tire longitudinal force, $\mu_x(\hat{\theta}_x,\lambda)$ is the utilization adhesion coefficient calculated based on an estimated value of the adhesion coefficient of the road surface and the slip rate, K is a gain of a longitudinal force estimator, $\theta_x(\lambda,\hat{F}_x)$ is the peak adhesion coefficient of the road surface calculated by a numerical calculation method from the curve described by the tire model based on a current longitudinal force and slip rate, $\hat{\theta}_x$ is an estimated value of the peak adhesion coefficient of the road surface under longitudinal excitation, and $\gamma$ is a gain of an adhesion coefficient estimator of the road surface.

Step 2, designing an estimator based on a two-degree-of-freedom kinematic model of the whole vehicle, and estimating the peak adhesion coefficient of the road surface under a tire aligning torque and lateral force excitation. The process includes:

2.1 Establishing the two-degree-of-freedom kinematic model of the whole vehicle.

Obtaining the slip angle of the wheel:

$$\alpha_f = \beta + \frac{l_f R}{v_0} - \delta$$

$$\alpha_r = \beta - \frac{l_r R}{v_0}$$

wherein $\delta$ is a rotation angle of a front wheel, $l_f$ and $l_r$ are respectively a distance from a center of the front wheel and of a rear wheel to a center of mass, $v_0$ is a longitudinal speed of the vehicle, $\beta$ is a side slip angle of the vehicle, and $\alpha_f$ and $\alpha_r$ are respectively a slip angle of the front wheel and of the rear wheel.

2.2 The estimation algorithm of the adhesion coefficient of the road surface under longitudinal tire force and longitudinal excitation.

An expression is as follows:

$$\hat{F}_x = \frac{I_w}{r}(y + K\omega) - F_z \cdot \mu_x(\hat{\theta}_x, \lambda)$$

$$\dot{y} = -\frac{K}{I_w}(T_m + R\hat{F}_x) + \frac{R}{I_w} \cdot \frac{\partial \mu_x(\hat{\theta}_x, \lambda)}{\partial \theta_x} \cdot \dot{\hat{\theta}}_x$$

$$\dot{\hat{\theta}}_x = \gamma[\theta_x(\lambda, \hat{F}_x) - \hat{\theta}_x]$$

wherein $\hat{F}_x$ is an estimated value of the tire longitudinal force, $\mu_x(\hat{\theta}_x,\lambda)$ is the utilization adhesion coefficient calculated based on an estimated value of the adhesion coefficient of the road surface and the slip rate, K is a gain of a longitudinal force estimator, $\theta_x(\lambda,\hat{F}_x)$ is the peak adhesion coefficient of the road surface calculated by a numerical calculation method from the curve described by the tire model based on a current longitudinal force and slip rate, $\hat{\theta}_x$ is an estimated value of the peak adhesion coefficient of the road surface under longitudinal excitation, and $\gamma$ is a gain of an adhesion coefficient estimator of the road surface.

Step 3, determining the excitation conditions met by the vehicle from vehicle state parameters, obtaining limits that the current longitudinal and lateral tire forces can reach by fuzzy inference, and thereby designing a fusion observer to fuse estimation results. The process includes:

3.1 Fuzzy inference of vehicle excitation states.

Inputting a membership function, taking a slip rate reference $\lambda/C_\lambda$ and a slip angle reference $\alpha/C_\alpha$ as input quantities, wherein $C_\lambda$ and $C_\alpha$ are catastrophe points at which tire characteristics enter a nonlinear zone and are respectively taken as the corresponding slip rate and slip angle at which the peak adhesion coefficient is reached, and both of the two items are obtained in real time through numerical calculation based on $\hat{\theta}$; and taking $\hat{C}_1$, $\hat{C}_2$ of different estimators as output quantities. Setting [0,1] as a domain of both the input quantities and the output quantities; and dividing the domain into corresponding intervals respectively having S, M and B (respectively corresponding to small, medium and large) fuzzy membership degrees.

3.2 An adaptive estimation algorithm of the peak adhesion coefficient of the road surface under complex excitations.

An expression is as follows:

$$\dot{\hat{\theta}}_x = \gamma[\theta_x(\lambda, \hat{F}_x) - \hat{C}_1 \cdot \hat{\theta}]$$

$$\dot{\hat{\theta}}_y = k_1\,\mathrm{sgn}(\dot{M}_k) \cdot (M_k - \hat{C}_2 \dot{M}_k) + k_2\,\mathrm{sgn}(\dot{\alpha}_y) \cdot (\alpha_y - \hat{C}_2 \dot{\alpha}_y)$$

$$\dot{\hat{\theta}} = \dot{\hat{\theta}}_x + \dot{\hat{\theta}}_y$$

A hardware device of the present invention requires sensors, including GPS, inertial elements and steering wheel rotation angle and torque sensors, and uses mass-produced electric controllers for the whole vehicle for data sampling, so as to implement on-line estimation by the algorithms designed in Steps 1 and 2. The fuzzy logic designed in Step 3 is burned into a controller in the form of a query table to obtain final fusion estimation results.

Parameter Description of the Embodiments

The superscript ^ represents an estimated value, the superscript · represents a first derivative, the subscript x represents a longitudinal direction, and the subscript y represents a lateral direction.

The above are merely specific embodiments of the present invention, however, the protection scope of the present invention is not limited thereto. Anyone who familiar with the technical field can easily conceive various equivalent modifications or substitutions within the technical scope revealed by the present invention. These modifications or substitutions should be included within the protection scope of the present invention. Therefore, the protection scope of the present invention should be subject to the protection scope of the claims.

What is claimed is:

1. A method of an adaptive estimation of an adhesion coefficient of a vehicle road surface considering complex excitation conditions, the method comprising the following steps:
1) designing an estimator based on a single-wheel dynamical model of a whole vehicle, estimating a peak adhesion coefficient of a road surface under a longitudinal tire force and a longitudinal excitation, and controlling a vehicle when braking based on the peak adhesion coefficient; wherein the single-wheel dynamical model samples data by torque sensors;
2) designing an estimator based on a two-degree-of-freedom kinematic model of the whole vehicle, and estimating the peak adhesion coefficient of the road surface under a tire aligning torque and a lateral force excitation;
3) determining excitation conditions met by the vehicle from vehicle state parameters, obtaining limits that current longitudinal and lateral tire forces can reach by a fuzzy inference, and thereby designing a fusion observer to fuse estimation results;
wherein in the step 1), the single-wheel dynamical model of the whole vehicle is as follows:

$$\dot{\omega} = \frac{1}{I_w}[T_m - \mu_x(\theta_x, \lambda) \cdot F_z \cdot R]$$

$$\lambda = \begin{cases} \frac{\omega \cdot R - v_x}{\omega \cdot R}; v_x < \omega \cdot R \\ \frac{v_x - \omega \cdot R}{v_x}; v_x \geq \omega \cdot R \end{cases}$$

wherein $\omega$ is an angular velocity of a wheel, $\dot{\omega}$ is an angular acceleration of the wheel, R is a radius of the wheel, $T_m$ is a driving/braking torque acting of the wheel, $F_z$ is a vertical load acting on the wheel, $I_w$ is a rotational inertia of the wheel, $\lambda$ is a slip rate of the wheel, $v_x$ is a longitudinal speed at a center of the wheel, and $\mu_x(\theta_x,\lambda)$ is a current utilization adhesion coefficient of a tire to the road surface obtained based on a tire model;
wherein in the step 1), an expression for estimating the peak adhesion coefficient of the road surface under the longitudinal tire force and the longitudinal excitation is as follows:

$$\hat{F}_x = \frac{I_w}{R}(y + K\omega) - F_z \cdot \mu_x(\hat{\theta}_x, \lambda)$$

$$\dot{y} = -\frac{K}{I_w}(T_m + R\hat{F}_x) + \frac{R}{I_w} \cdot \frac{\partial \mu_x(\hat{\theta}_x, \lambda)}{\partial \theta_x} \cdot \dot{\hat{\theta}}_x$$

$$\dot{\hat{\theta}}_x = \gamma[\theta_x(\lambda, \hat{F}_x) - \hat{\theta}_x]$$

wherein $\hat{F}_x$ is an estimated value of the tire longitudinal force, $\mu_x(\hat{\theta}_x,\lambda)$ is a utilization adhesion coefficient calculated based on an estimated value of the adhesion coefficient of the road surface and the slip rate, K is a gain of a longitudinal force estimator, $\theta_x(\lambda,\hat{F}_x)$ is the peak adhesion coefficient of the road surface calculated from a curve described by the tire model based on a current longitudinal force and the slip rate, $\hat{\theta}_x$ is an estimated value of the peak adhesion coefficient of the road surface under the longitudinal excitation, $\gamma$ is a gain of an adhesion coefficient estimator of the road surface, y is an intermediate variable, $\dot{y}$ is a derivative of y with respect to time, and $\dot{\hat{\theta}}_x$ is a derivative of $\hat{\theta}_x$ with respect to time.

2. The method of the adaptive estimation of the adhesion coefficient of the vehicle road surface considering complex excitation conditions according to claim 1, wherein an expression of the tire model is as follows:

$$\mu(\theta, \lambda) = \theta - \theta e^{-\frac{c_1}{\theta}(\lambda + c_2 \lambda^2)} - c_3 \lambda \text{sgn}(\lambda) + c_4 \lambda^2$$

wherein $\theta$ is the peak adhesion coefficient of the road surface, i.e., the peak adhesion coefficient of the road surface corresponding to a highest point of a $\mu$–$\lambda$ curve, $c_1$ is a longitudinal slip stiffness of the tire, i.e., a slope of the $\mu$–$\lambda$ curve at an origin, and $c_2$, $c_3$ and $c_4$ are respectively control parameters for a descending section of a curve of the peak adhesion coefficient of the road surface versus the slip rate.

3. The method of the adaptive estimation of the adhesion coefficient of the vehicle road surface considering complex excitation conditions according to claim 1, wherein in the step 2), the two-degree-of-freedom kinematic model of the whole vehicle is as follows:

$$\alpha_f = \beta + \frac{l_f R}{v_0} - \delta$$

$$\alpha_r = \beta - \frac{l_r R}{v_0}$$

wherein $\delta$ is a rotation angle of a front wheel, $l_f$ and $l_r$ are respectively a distance from a center of the front wheel and of a rear wheel to a center of mass, $v_0$ is a longitudinal speed of the vehicle, $\beta$ is a side slip angle of the vehicle, $\alpha_f$ and $\alpha_r$ are respectively a slip angle of the front wheel and of the rear wheel, and R is the radius of the wheel.

4. The method of the adaptive estimation of the adhesion coefficient of the vehicle road surface considering complex excitation conditions according to claim 3, wherein in the step 2), an expression for estimating the peak adhesion coefficient of the road surface under the tire aligning torque and the lateral force excitation is as follows:

$$M_k = A\dot{\delta}_w + B\ddot{\delta}_w + i_s(\delta_w)M_s + i_m(\delta_w)M_m$$

$$\hat{M}_k = f(\alpha, F_z)$$

$$\dot{\hat{\theta}}_y = k_1 \operatorname{sgn}(\hat{M}_k)\cdot(M_k - \hat{M}_k) + k_2 \operatorname{sgn}(\hat{\alpha}_y)\cdot(\alpha_y - \hat{\alpha}_y)$$

wherein $\alpha$ is a slip angle of the wheel, $\delta_w$ is a rotation angle of a steering wheel, $i_s(\delta_w)$ is a torque-to-rotation ratio of a booster motor to a master pin, $i_m(\delta_w)$ is a torque-to-rotation ratio of the steering wheel to the master pin, $M_m$ is a torque applied to the steering wheel, $M_s$ is a torque of the booster motor, A and B are fitting parameters, $M_k$ is a fitting total aligning torque, $\hat{M}_k$ is an estimated value of an aligning torque calculated based on the vertical load of the wheel and the slip angle of the wheel, $F_z$ is the vertical load applied on the wheel, $\hat{\alpha}_y$ is an estimated value of a lateral acceleration of the vehicle, $\alpha_y$ is an actual value of the lateral acceleration of the vehicle, $k_1$ and $k_2$ are gains of estimators, Oy is an estimated value of the peak adhesion coefficient of the road surface under the lateral force excitation, and $\dot{\hat{\theta}}_y$ is a derivative of $\hat{\theta}_y$ with respect to time.

5. The method of the adaptive estimation of the adhesion coefficient of the vehicle road surface considering complex excitation conditions according to claim 4, wherein the step 3) comprises:

31) obtaining a vehicle excitation state by the fuzzy inference;

32) performing the adaptive estimation of the peak adhesion coefficient of the road surface under a complex excitation.

6. The method of the adaptive estimation of the adhesion coefficient of the vehicle road surface considering complex excitation conditions according to claim 5, wherein the step 31) is as follows:

inputting a membership function, taking a slip rate reference $\lambda/C_\lambda$ and a slip angle reference $\alpha/C_\alpha$ as input quantities, wherein $C_\lambda$ and $C_\alpha$ are catastrophe points at which tire characteristics enter a nonlinear zone and are respectively taken as a corresponding slip rate and the slip angle at which the peak adhesion coefficient is reached, and taking $\hat{C}_1$, $\hat{C}_2$ of different estimators as output quantities; setting [0,1] as a domain of both the input quantities and the output quantities; and dividing the domain into corresponding intervals respectively having small, medium and large fuzzy membership degrees.

7. The method of the adaptive estimation of the adhesion coefficient of the vehicle road surface considering complex excitation conditions according to claim 6, wherein in the step 32), an expression for performing the adaptive estimation of the peak adhesion coefficient of the road surface under a complex excitation is as follows:

$$\dot{\hat{\theta}} = \dot{\hat{\theta}}_x + \dot{\hat{\theta}}_y$$

$$\dot{\hat{\theta}}_x = \gamma[\theta_x(\lambda, \hat{F}_x) - C_1 \cdot \hat{\theta}]$$

$$\dot{\hat{\theta}}_y = k_1 \operatorname{sgn}(\hat{M}_k)\cdot(M_k - \hat{C}_2 \hat{M}_k) + k_2 \operatorname{sgn}(\hat{\alpha}_y)\cdot(\alpha_y - \hat{C}_2 \hat{\alpha}_y)$$

wherein $\hat{C}_1$ is a representative value of a longitudinal sliding degree of the wheel, $\hat{C}_2$ is a representative value of a side slip degree of the wheel, and $\hat{\theta}$ is an estimated value of the peak adhesion coefficient of the road surface.

* * * * *